3,123,343
FOOD MIXER
Harry H. Wilson, Riverside, and Earle V. Carey, Lucerne Valley, Calif.; said Carey assignor to said Wilson
Filed Nov. 27, 1961, Ser. No. 154,976
5 Claims. (Cl. 259—109)

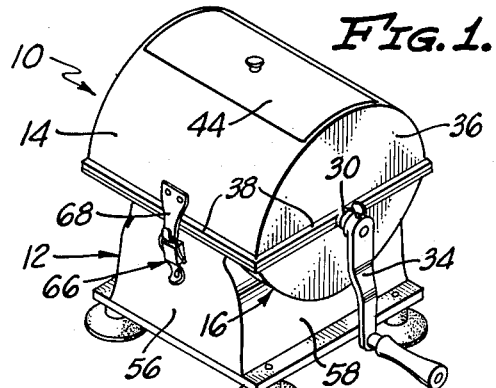
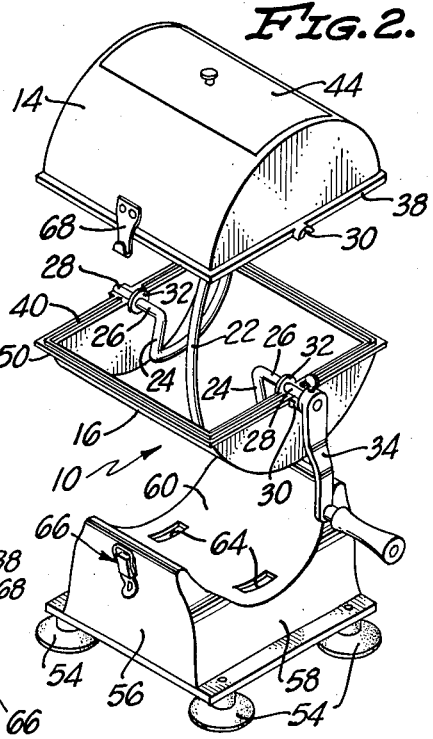
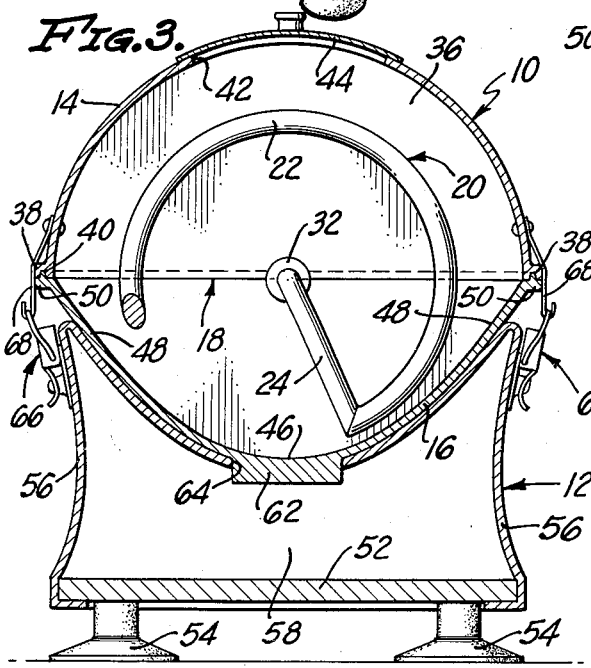
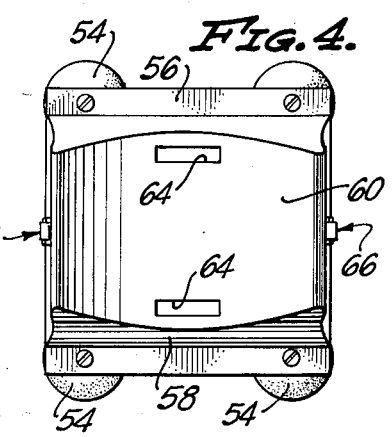
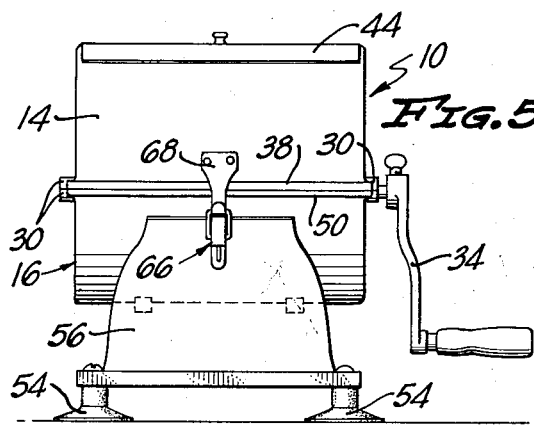
INVENTORS
HARRY H. WILSON,
EARLE V. CAREY
BY Herbert E. Kidder
AGENT United States Patent Office 3,123,343
Patented Mar. 3, 1964

The present invention relates to food mixers intended primarily, although not exclusively, for home use. The mixer of the present invention is used chiefly for mixing and kneading bread dough or the like, but it may also be used to good advantage in mixing fruit salads, tossed green salads, and the like, wherein a gentle mixing and turning, or tossing action is desired.

In food mixers of this type, the food ingredients are agitated within a mixing compartment or chamber by means of a rotatable mixing member. In order to handle an ample quantity of bread dough or other ingredients, and to allow for expansion of dough in rising, the mixing compartment is made with a substantial capacity. At the same time, it is necessary to provide a solid, firm base for the mixing compartment, since some materials, such as bread dough and the like, require application of considerable turning force to the mixing member, which necessitates either clamping the mixer to a table-top, or using a substantial base with suction-cup feet provided thereon. In either case, the construction becomes rather sizeable, making it difficult and awkward to wash the mixer thoroughly in a kitchen sink after use.

The primary object of the present invention is to provide a food mixer of the class described which can be separated into several component parts of convenient size for ease of cleaning.

Another object is to provide a two-piece, generally cylindrical food mixing compartment mounted upon a substantial base to provide solid support for the same, wherein the bottom section of the mixing compartment is separable from the top section to facilitate cleaning.

Still a further object of the invention is to provide a food mixer embodying a two-piece mixing compartment mounted upon a substantial base having suction-cup feet or the like, wherein means is provided for quickly and easily clamping the three parts tightly together to form a solid assembly of great strength and rigidity, yet which can easily be separated into its components for ease of cleaning by merely flipping two clamps and lifting the two mixing compartment sections away from the base.

These and other objects and advantages of the present invention will become apparent to those skilled in the art upon consideration of the following detailed description of the preferred embodiment thereof, reference being had to the accompanying drawings, wherein:

FIGURE 1 is a perspective view of a food mixer embodying the principles of the invention;

FIGURE 2 is an exploded view of the same;

FIGURE 3 is a transverse sectional view;

FIGURE 4 is a top plan view, looking down on the base member with the mixing compartment removed; and FIGURE 5 is a side elevational view of the food mixer.

The apparatus of the present invention consists of a food mixing compartment or casing 10 of approximately cylindrical configuration, having its longitudinal axis disposed horizontally, and this compartment is mounted upon a base 12. The mixing compartment 10 consists of a top section 14 and bottom section 16, having edges that abut at 18 in a horizontal plane passing through the axis of rotation of a rotatable mixing member 20.

The mixing member 20 is preferably in the form of a spiral rod 22 having radially inwardly projecting end portions 24 that terminate in outwardly bent shaft portions 26. Each of the shaft portions 26 has a journal 28 that turns in a bearing 30 centered in the ends of the respective compartment section 14, 16. A shielding flange 32 projects radially from each of the shaft portions 26 inside the compartment end walls closely adjacent the bearings 30 to seal the bearings against particles of food ingredients. One of the shaft portions 26 projects outwardly beyond the end of the mixing compartment, and fixed to the projecting end thereof is a hand crank 34.

The top section 14 of the mixing compartment is semi-cylindrical in configuration, with semi-circular ends 36. The top section 14 is concentric with the spiral mixing member 20, and is spaced outwardly therefrom (see FIG. 3) to provide ample clearance for the foods being mixed in the compartment. Projecting horizontally from the edge of the top section 14 around all four sides thereof is a flange 38 having a longitudinally extending groove formed in the underside thereof to receive a tongue 40 projecting upwardly from the edge of the bottom section 16. This tongue and groove joint between the top and bottom sections 14 and 16 provides a substantially fluid-tight junction between them, and prevents leakage of liquid ingredients being mixed. A rectangular opening 42 is provided in the top of the upper section 14 through which the food ingredients are dropped into the mixing compartment, and a removable cover plate 44 is placed over the opening to close the same when the mixer is being operated.

The bottom compartment section 16 is approximately parabolic in cross section, as best seen in FIGURE 3, with a generally cylindrical bottom portion 46 and outwardly flared side portions 48. The bottom portion 46 is concentric with the spiral mixing member 20 and is relatively close thereto, so as to enable the mixing member 20 to reach down almost to the bottom of the compartment, and thereby mix or knead all of the dough or other food ingredients contained within the compartment. A horizonal flange 50 projects outwardly from the edge of the bottom section 16 around all four sides thereof, and the tongue 40 rises from the top surface of this flange.

As mentioned earlier, the mixing compartment 10 is mounted on the base 12 for support. The base 12 is generally rectangular, as seen from above, and preferably includes a rectangular bottom plate 52 of wood, to which suction cup feet 54 are attached at the four corners. Secured to the bottom plate 52 along all four edges thereof and rising generally perpendicular to the plane thereof, are sheet metal sides 56 and ends 58. The top surface 60 of the base member 12 is formed to the same approximately parabolic curvature as the bottom compartment section 16, so that the latter seats snugly within and is cradled by the base 12.

Projecting downwardly from the underside of the bottom compartment section 16 are two rectangular protuberances, or bosses 62, which are spaced apart along the longitudinal axis of the mixing compartment 10. Formed in the top surface 60 of the base 12 are two rectangular openings 64, which are disposed to receive the bosses 62 when the bottom section 16 is seated on the base 12. The bosses 62 fit snugly within the openings 64, and prevent any relative movement between the mixing compartment 10 and the base 12, in either direction.

The mixing compartment 10 is clamped firmly down into its seat on the base 12 by means of two clamps 66, which are mounted on opposite sides 56 of the base adjacent the top edge thereof. The clamps 66 engage depending strap hooks 68 which are attached to the top section 14 on opposite sides thereof above the clamps 66. When the top section 14 is in position on the bottom section 16, and the latter is seated on the base 10, the strap hooks 68 are engageable by the clamps 66, and when the latter are tightened up, the entire assembly is clamped tightly together in a solid, rigid construction.

To disassemble the food mixer for cleaning purposes, all that is necessary is to flip the two clamps 66 upwardly, which releases the strap hooks 68 and allows the top section 14 to be lifted away from the bottom section 16, and the section to be lifted away from the base 12. In this way, the otherwise bulky and awkward body of the food mixer is broken up into several smaller components, which are of a more convenient size for washing in a kitchen sink.

While we have shown and described in considerable detail what we believe to be the preferred embodiment of our invention, it will be understood by those skilled in the art that various changes may be made in the shape and arrangement of the several parts without departing from the broad scope of the invention as defined in the following claims.

We claim:

1. In a food mixer having a two-piece, generally cylindrical compartment and a rotatable mixing member journaled therein, said compartment consisting of separable top and bottom sections having abutting edges disposed in a horizontal plane passing through the axis of rotation of said mixing member, the improvement comprising a base member having a seat in the top side thereof shaped to receive and conform to the underside of said bottom compartment section, said seat and said bottom compartment section having companionate means that interfit to locate said base and said bottom section with respect to one another and prevent relative shifting, and cooperating means on said base member and on said top compartment section for releasably clamping said top section down against said bottom section and thereby securing said compartment to said base member, whereby said bottom compartment section and said mixing member can be removed from said base member and from said top section for cleaning purposes.

2. The invention as defined in claim 1, wherein said companionate means on said bottom compartment section and on said seat comprises a downwardly projecting protuberance on said bottom section and an opening in said seat shaped to receive said protuberance with a snug fit.

3. The invention as defined in claim 1, wherein said cooperating means on said base member and on said top compartment section comprises a pair of releasable clamps on opposite sides of said base member adjacent the top edge thereof, and a pair of catches attached to opposite sides of said top compartment adjacent the bottom edge thereof, said catches being engageable by said clamps and being drawn downwardly thereby when said clamps are locked.

4. In a food mixer having a two-piece, generally cylindrical, horizontally disposed mixing compartment, and a rotatable mixing member journaled therein, said compartment consisting of separable top and bottom sections having abutting edges disposed in a horizontal plane passing substantially through the longitudinal axis of said compartment, the improvement comprising a base member having an upwardly facing, generally cylindrical curved seat to receive and conform to the underside of said bottom compartment section, a pair of rectangularly shaped bosses projecting downwardly from the underside of said bottom section adjacent opposite ends thereof, said seat having a pair of rectangularly shaped openings disposed to receive said bosses with a snug fit so as to prevent shifting of said compartment relative to said base member, a pair of releasable clamps mounted on opposite sides of said base member adjacent the top edge thereof, and a pair of catches attached to opposite sides of said top compartment section adjacent the bottom edge thereof, said catches being engageable by said clamps and being drawn downwardly thereby to secure said mixing compartment tightly to said base member, said clamps being releasable from said catches to permit separation of said bottom compartment section from said base member and from said top section for cleaning purposes.

5. In a food mixer having a two part mixing compartment and a rotatable spiral mixing member journaled therein, said compartment consisting of top and bottom sections having abutting edges disposed in a horizontal plane passing through the axis of said mixing member, the improvement comprising: a base member having a seat in the top side thereof shaped to receive and conform to the underside of said bottom compartment section; said bottom compartment section being approximately parabolic in cross section, with a generally cylindrical bottom portion concentric with said spiral mixing member and closely adjacent thereto, and outwardly flared side portions; said top compartment section being semi-cylindrical in configuration, concentric with said spiral mixing member, and spaced therefrom; said bottom compartment section having at least one lug projecting downwardly therefrom and said seat having an aperture provided therein to receive said lug in a snug fit so as to locate said base member and said bottom section with respect to one another and prevent relative shifting; and a pair of releasable clamps disposed on opposite sides of said mixing compartment, each of said clamps comprising a first part mounted on said base member adjacent the top edge thereof, and a second part mounted on said top compartment section adjacent the bottom edge thereof; said clamps being operable to draw said top compartment section downwardly against said bottom compartment section so as to secure said mixing compartment to said base member, and said clamps being releasable to permit separation of said top section, said bottom section and base member from one another for cleaning purposes.

References Cited in the file of this patent

UNITED STATES PATENTS

| 480,674 | Schaefer | Aug. 9, 1892 |
| 1,490,392 | Lauterbur | Apr. 15, 1924 |
| 1,793,934 | Hommel | Feb. 24, 1931 |

FOREIGN PATENTS

| 18,679 | Denmark | Apr. 6, 1914 |